(12) United States Patent
Schotten et al.

(10) Patent No.: US 7,545,866 B2
(45) Date of Patent: Jun. 9, 2009

(54) DUAL LOOP SIGNAL QUALITY BASED LINK ADAPTATION

(75) Inventors: Hans Dieter Schotten, Nürnberg (DE); Matthias Schulist, Erlangen (DE); Ralf Weber, Kaichreuth (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 574 days.

(21) Appl. No.: 10/549,275

(22) PCT Filed: Mar. 17, 2003

(86) PCT No.: PCT/EP03/02775

§ 371 (c)(1),
(2), (4) Date: Sep. 13, 2005

(87) PCT Pub. No.: WO2004/084479

PCT Pub. Date: Sep. 30, 2004

(65) Prior Publication Data

US 2006/0171478 A1    Aug. 3, 2006

(51) Int. Cl.
*H04L 27/00* (2006.01)
(52) U.S. Cl. .................. 375/259; 375/221; 375/316; 375/219; 455/522
(58) Field of Classification Search ............ 375/259, 375/219, 221, 316; 455/522
See application file for complete search history.

(56) References Cited

U.S. PATENT DOCUMENTS

| | | | |
|---|---|---|---|
| 4,736,388 A * | 4/1988 | Eguchi | 375/285 |
| 4,991,184 A | 2/1991 | Hashimoto | |
| 6,373,878 B1 * | 4/2002 | Palenius et al. | 375/136 |
| 6,490,461 B1 | 12/2002 | Müller | |
| 6,507,619 B1 * | 1/2003 | Thomson et al. | 375/241 |
| 7,206,332 B2 * | 4/2007 | Kwan et al. | 375/140 |
| 2001/0017904 A1 * | 8/2001 | Pukkila et al. | 375/350 |

FOREIGN PATENT DOCUMENTS

| | | |
|---|---|---|
| EP | 0 853 393 | 7/1998 |
| EP | 0 969 604 | 1/2000 |
| EP | 1 176 750 | 1/2002 |
| EP | 1 182 803 | 2/2002 |
| EP | 1255368 A1 * | 11/2002 |
| WO | 01/78251 | 10/2001 |

OTHER PUBLICATIONS

International Search Report for PCT/EP/03/02775 dated Nov. 5, 2003.
Schotten et al., *System Performance Gain by Interference Cancellation for WCDMA Dedicated and High-Speed Downlink Channels*, Ericsson presentation VTC 2002, Vancouver, 14 pages.

* cited by examiner

*Primary Examiner*—Juan A Torres
(74) *Attorney, Agent, or Firm*—Nixon & Vanderhye P.C.

(57) ABSTRACT

A communications link is adapted based on a quality estimate for a signal transmitted via the communications link. The method comprises receiving and demodulating the transmitted signal, assessing the demodulated signal to derive a first estimate for the signal quality that is to be used in a link adaptation scheme, and further processing and decoding the demodulated signal. Based on at least one of the further processed, non-decoded signal and information obtained prior to conclusion of decoding, a first control signal indicative of the signal quality is generated and utilized to control the link adaptation scheme.

12 Claims, 8 Drawing Sheets ns link.

DUAL LOOP SIGNAL QUALITY BASED LINK ADAPTATION

This application is the US national phase of international application PCT/EP2003/002775 filed 17 Mar. 2003, which designated the U.S., the entire content of which is hereby incorporated by reference.

TECHNICAL FIELD

The technology relates to a method, a device and a system that are involved in a link adaptation mechanism. More specifically, the technology relates to adapting a communications link between a transmitter and a receiver based on a quality estimate for a signal transmitted via the communications link.

BACKGROUND

Wireless cellular communications is continuing to grow unabated. As wireless applications become increasingly widespread, the pressure on network operators to increase the capacity of their networks becomes more intense.

There are a number of ways of enhancing capacity in a wireless cellular network, including frequency hopping, micro cells, the introduction of adaptive antennas, and link adaptation. Link adaption has thus become an object of increasing interest in recent years.

In the following, conventional link adaptation mechanisms will be described for an exemplary wideband code division multiple access (WCDMA) scenario. A typical WCDMA scenario including two mobile devices (user equipment, UE), a base station (BS) communicating with the UEs, and a radio network controller (RNC) communicating with the BS is shown in FIG. 1. As can be seen from FIG. 1, WCDMA downlink transport channels to the UEs include a dedicated channel (DCH) and a high-speed downlink shared channel (HS-DSCH). The HS-DSCH is allocated to an UE on a time-slot by time-slot basis.

The basic link adaptation mechanisms in the WCDMA standard include power control on the DCH and adaptive coding and modulation on the HS-DSCH. Power control on DCH avoids allocating more power than is actually required to achieve a certain decoding quality to individual communications links. Since the total transmit power of the BS is limited, the implementation of such a power control scheme increases the network capacity. Additionally, avoiding excessively high power levels helps to reduce signal interference.

According to the link adaptation mechanism of adaptive coding and modulation, the transmission rate is adapted to the time-varying channel and interference conditions. In the case of favourable channel conditions for example, a larger modulation format or higher code rate is used to increase the data rate and thus enhance the network capacity.

A power control scheme in a WCDMA link adaptation context is for example described in H. Schotten and J. Rößler, "System Performance Gain in Interference Cancellation for WCDMA Dedicated and High-Speed Downlink Channels", VTC 2002, Vancouver. The UE receiver configuration required to implement such a power control based link adaptation mechanism is depicted in FIG. 2 and will now be described in more detail.

A signal received from the BS by the UE receiver is demodulated, Rake combined and subjected to an interference cancellation step. Based on the signal that has been subjected to interference cancellation, an estimate for the signal-to-interference ratio (SIR) is determined and compared to a SIR target value. Depending on the result of this comparison, a power control algorithm generates a power up or a power down command for downlink that is sent in the uplink to the BS. Thus, a fast power control loop is established that allows adjustment of the power once per slot (at a rate of 1500 slots per second).

In addition to this fast power control loop an outer power control loop is provided. The outer power control loop adjusts the target SIR setpoint and aims at a constant frame error rate (FER). Outer loop control is based on a check of the cyclic redundancy code (CRC) that is obtained during decoding of a particular data frame. If for example the CRC check indicates that the transmission quality is decreasing, the SIR target may be increased and vice versa.

As has been mentioned above, adaptive coding and modulation is a further example of an efficient link adaptation mechanism. In FIG. 6, an approach for adaptive coding and modulation on a HS-DSCH known from H. Schotten and J. Rößler, "System Performance Gain in Interference Cancellation for WCDMA Dedicated and High-Speed Downlink Channels", VTC 2002, Vancouver is depicted. In the scenario of FIG. 6, the transmission power is kept constant but the transmission rate is adapted to the current channel and interference conditions. A received signal that has been demodulated, Rake combined and subjected to interference cancellation is assessed to generate an estimate for the channel quality. This estimate is then used for channel quality indicator (CQI) signaling in uplink. The CQI signaling determines the modulation format and code rate that is used on downlink. By varying the modulation format and the code rate, the data rate on downlink can be adapted to the time-varying channel and interference conditions.

Efficient link adaptation requires a sufficiently accurate estimation of the quality of the received signal on the one hand and, to closely track channel and interference conditions, a low estimation and reporting delay of the signal quality on the other hand. These requirements are contradictory because depending on the implementation details of the receiver, a fast estimation of signal quality and a low reporting delay do often not allow a sufficiently accurate signal quality estimation.

There is thus a need for a method, a device and a system that enable a more efficient link adaptation based on a signal quality estimate.

SUMMARY

The need for efficiently adapting a communications link between a transmitter and a receiver based on a quality estimate for a signal transmitted via the communications link is satisfied by a link adaptation approach comprising receiving and demodulating the transmitted signal, assessing the demodulated signal to derive a first estimate for the signal quality that is to be utilized in a link adaptation scheme, and further processing and decoding the demodulated signal. Based on at least one of the further processed, non-decoded signal and information obtained prior to conclusion of decoding, a first control signal indicative of the signal quality is generated and utilized to control the link adaptation scheme.

Control of the link adaptation scheme based on the first control signal prior to completion of the decoding operation allows an improved link adaptation with respect to the tracking speed and tracking accuracy of time-varying channel and interference conditions. Moreover, based on the first control signal, it is possible to implement signal quality estimation as a two-step or multiple-step procedure. Thus signal quality estimation becomes more robust.

The further processing that is performed between demodulation and decoding preferably includes at least one of Rake combining, de-interleaving and advanced receiver techniques like interference cancellation. It is particularly advantageous to derive the first estimate for the signal quality from the demodulated signal prior to subjecting the demodulated signal to an advanced receiver technique and to generate the first control signal generated on the basis of a signal that has been subjected to an advanced receiver technique. Generation of the first estimate prior to performing an advanced receiver technique ensures that an additional processing delay associated with the advanced receiver technique does not result in a link adaptation delay. Additionally, controlling the link adaptation scheme with the first control signal after the advanced receiver technique has been performed allows (prior to conclusion of demodulation) the taking into account of signal enhancement effects that resulted from the advanced receiver technique and that would not be or only with difficulty be predictable prior to applying the advanced receiver technique to the demodulated signal.

The first control signal may be generated on the basis of a second estimate for the signal quality or may form the basis for generating the second estimate. The first estimate and the second estimate for the signal quality are preferably derived from the demodulated signal at different processing stages. This means that the demodulated signal from which the second estimate is derived might have been processed further compared to the demodulated signal that formed the basis for deriving the first estimate. Thus, the second estimate will in general be more accurate than the first estimate but will become available at a later point in time. The second estimate, although more accurate, will therefore be associated with a larger processing delay.

At least one of the first control signal and the second estimate may be generated based on metrics information obtained during further processing or decoding. Thus, metrics information derived in the receiver may be utilized to control the link adaptation scheme.

Various link adaptation schemes can be implemented. According to a preferred example, the link adaptation scheme includes an association between the first estimate and an adaptation signal controlling the counterpart of the receiver, i.e., the transmitter. Such an association may for example be defined by a mapping mechanism or any other mechanism that allows generation of an adaptation signal from the first estimate in a replicable manner. The adaptation signal may for example be a power up command, a power down command or a command that is used in context with CQI signalling.

If a link adaptation scheme defining an association between the first estimate and an adaptation signal is implemented, the first control signal may be used to control (e.g. change) this association. If for example a mapping mechanism between the first estimate and a corresponding adaptation signal is defined, the first control signal may be used to adjust this mapping mechanism to thereby improve link adaptation, e.g., improve at least one of transmit power control, adaptive coding and adaptive modulation.

The decoded signal or information like the CRC obtained as a decoding result may be assessed to generate a second control signal for e.g. additionally controlling the link adaptation scheme or for triggering re-transmission. The second control signal will however not be based on an estimate for the signal quality but on a "hard figure" like the CRC or on the decoded signal. The second control signal allows implementation of a two-step control of the link adaptation scheme, namely a faster but less accurate control step on the basis of the first control signal and a slower but more accurate control step on the basis of the second control signal.

According to a further aspect in context with the link adaptation schemes of adaptive coding, adaptive modulation or a combination thereof, a first estimate for the signal quality that is to be utilized in the particular link adaptation scheme is derived from the demodulated signal prior to decoding thereof. Based on the decoded signal or on information that has become available only after decoding (like the CRC), a control signal indicative of the signal quality may be generated and utilized to control at least one of adaptive coding and adaptive modulation. The first control signal is preferably generated on the basis of an assessment of the CRC.

The technology can be implemented as a hardware solution or as a computer program product comprising program code portions for performing the method when the computer program product is run on a computing device. The computer program product may be stored on a computer-readable recording medium that is for example in fixed association with or removable from the computing device.

A receiver is configured to be coupled by an adaptable communications link to a transmitter, wherein link adaptation is performed based on an estimate of the signal transmitted via the communications link to the receiver. The receiver comprises a demodulator for demodulating the received signal, at least one processing component the further processing the demodulated signal, and a decoder for decoding the further processed signal. A first signal branch of the receiver is coupled to a first node between the demodulator and the at least one processing component.

The first branch includes a first estimating component for deriving a first estimate for the signal quality that is to be utilized in a link adaptation scheme. A second signal branch of the receiver is coupled to at least one of the processing component, the decoder and a second node between a processing component and the decoder. The second signal branch is configured to transmit a first control signal that is indicative of the signal quality and that controls the link adaptation scheme. The processing component preferably performs at least one of Rake combining, de-interleaving and one or more advanced receiver techniques like interference cancellation.

In the second signal branch a second estimating component can be arranged for deriving a second estimate for the signal quality based on which the first control signal may be generated. In addition to the first and the second signal branch a third signal branch may be provided. The third signal branch can be coupled to a third node arranged in a signal path after the decoder and may include an assessment unit that generates a second control signal for controlling the link adaptation scheme.

According to a further aspect, a receiver demodulates a received signal, a decoder decodes the demodulated signal, a first signal branch is coupled to a first node between the demodulator, and the decoder and a second signal branch are coupled to the decoder or a second node in a signal path behind the decoder. The first signal branch includes a first estimating component for deriving a first estimate for the signal quality that is to be utilized in a link adaptation scheme relating to at least one of adaptive coding and adaptive modulation. The second signal branch is configured to transmit a control signal which is indicative of the signal quality and controls the link adaptation scheme.

The receivers discussed above may be included in a mobile terminal like a UE. Alternatively or additionally, the receivers may be incorporated in a non-mobile device like a BS.

According to still a further aspect, a wireless communications system includes a transmitter, a receiver and an adaptable communications link between the transmitter and the receiver. The system comprises on a receiver side a demodulator for demodulating the transmitted signal, at least one processing component for further processing the demodulated signal, and a decoder for decoding the further processed signal. The system further comprises a first control loop stretching between the transmitter and the receiver, the first control loop including a first node arranged between the demodulator and the at least one processing component and further including a first estimating component for deriving a first estimate for the signal quality that is to be utilized in a link adaptation scheme. The estimating component may be part of the transmitter or of the receiver. The system further comprises a control branch including at least one of the processing component, the decoder and a second node between the processing component and the decoder. The control branch is configured to transmit a first control signal. The first control signal is indicative of the signal quality and controls the link adaptation scheme.

A second control loop can be provided that includes the decoder or a third node arranged in a signal path after the decoder. The second control loop may additionally comprise an assessment unit for generating a second control signal for controlling the link adaptation scheme or for triggering re-transmission.

DETAILED DESCRIPTION

In the following description, for purposes of explanation and not limitation, specific details are set forth, such as particular embodiments, circuits, signal formats etc. in order to provide a thorough understanding of the present invention. It will be apparent to one skilled in the art that the present invention may be practiced in other embodiments that depart from these specific details. In particular, while the different embodiments are described herein below incorporated in a WCDMA system, the present invention is not limited to such an implementation, but for example can be utilized in any transmission environment that requires link adaptation. Moreover, those skilled in the art will appreciate that the functions explained herein below may be implemented using individual hardware circuitry, using software functioning in conjunction with a programmed microprocessor or general purpose computer, using an application specific integrated circuit (ASIC), and/or using one or more digital signal processors (DSPs).

Figure 1:
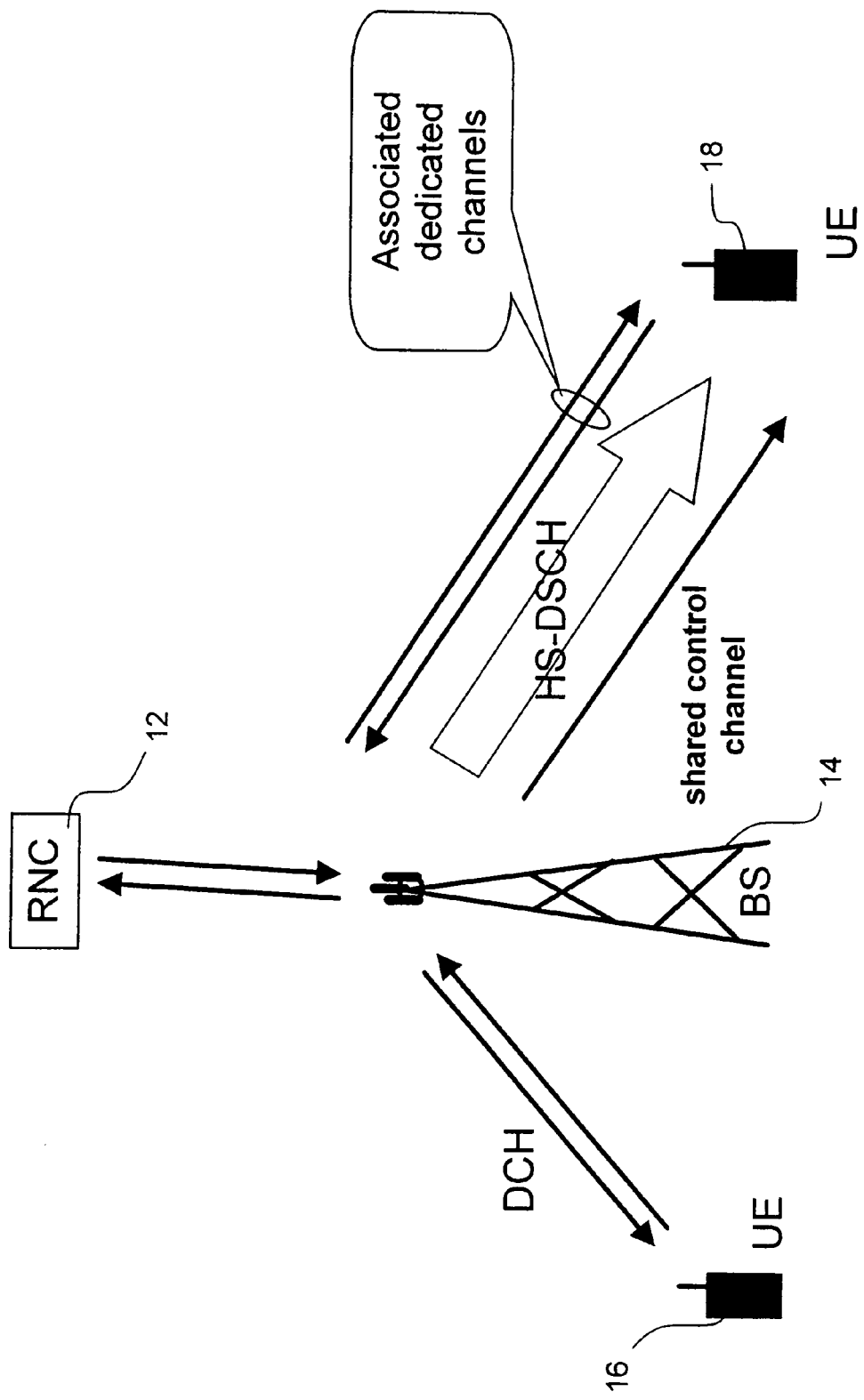
FIG. 1 is a schematic block diagram of a WCDMA wireless communications system.
Figure 2:
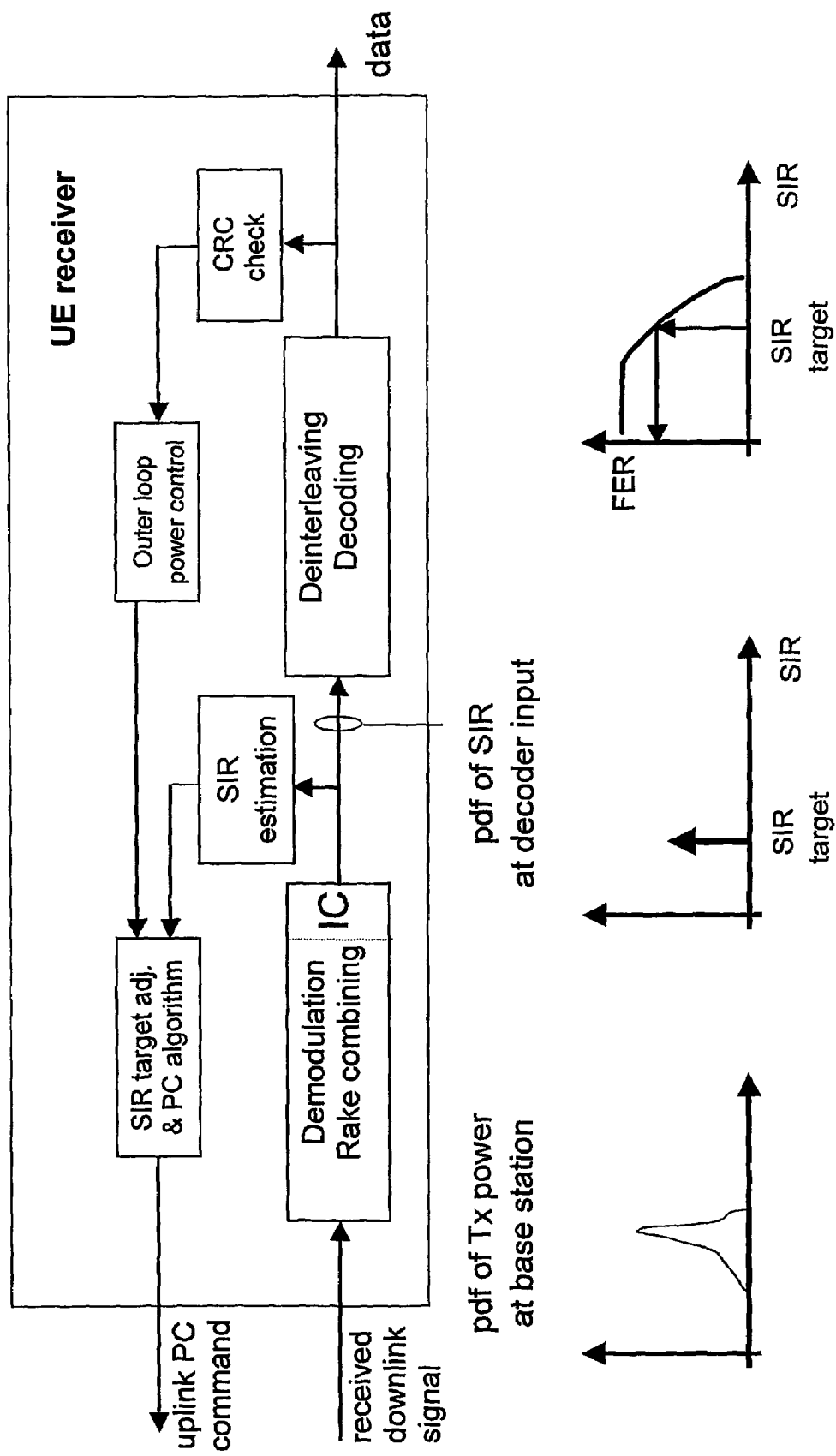
FIG. 2 is a schematic block diagram of a prior art link adaptation mechanism based on power control.

FIG. 1 shows a wireless communications system 10 according to the WCDMA standard. As has been mentioned before, the system 10 includes an RNC 12, a BS 14, a first UE communicating with the BS 14 on DCH and a second UE 18 receiving information from the BS 14 on HS-DSCH.

Figure 3:
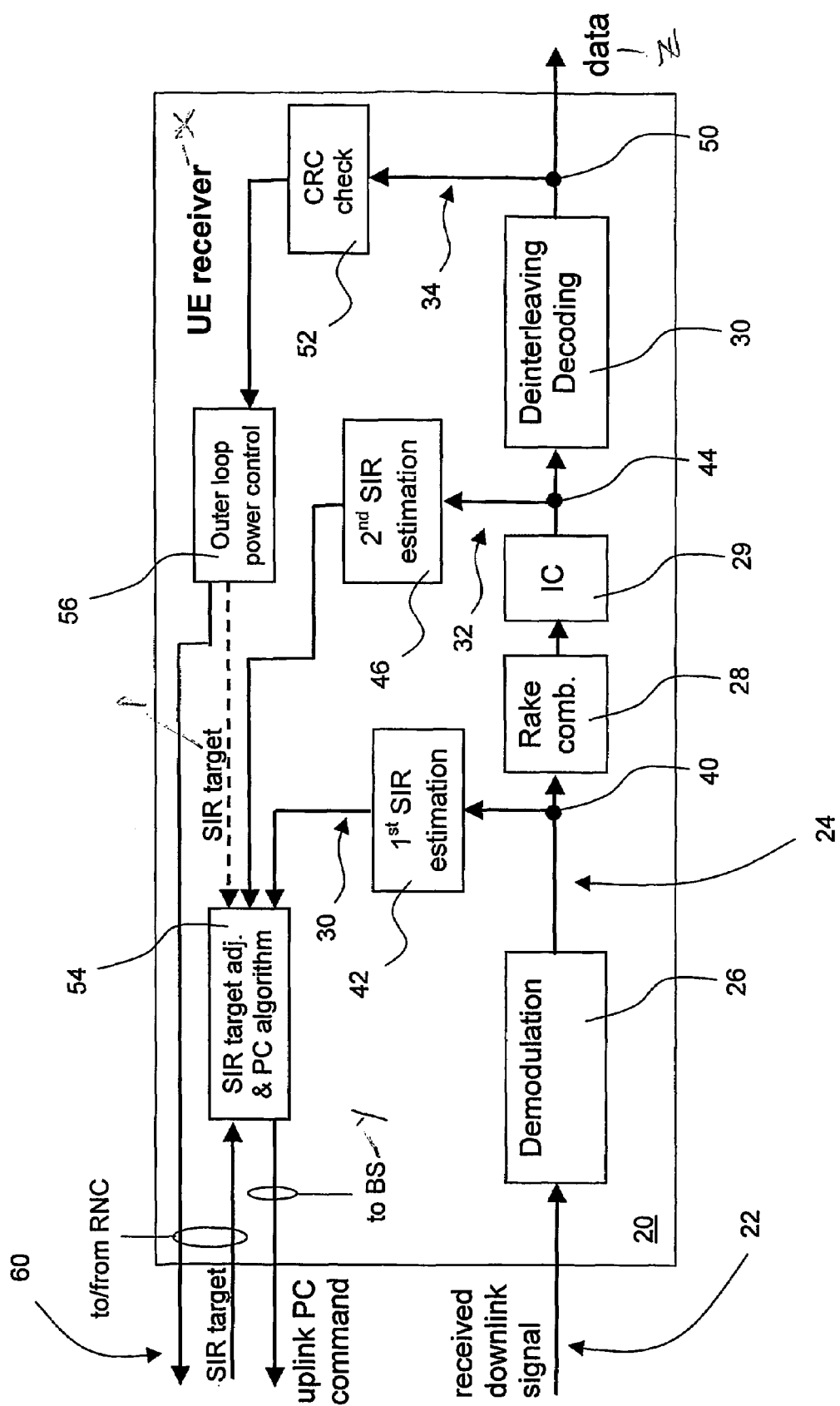
FIG. 3 is a first example embodiment of a link adaptation mechanism based on power control.

In FIG. 3 a schematic block diagram of a UE receiver 20 according to a first example embodiment as implemented in the UE 16 depicted in FIG. 1 is shown. The receiver 20 of FIG. 3 is configured to communicate via an adaptable communications link 22 with a transmitter in the form of the BS 14 depicted in FIG. 1. In the present embodiment the adaptable communications link 22 is the power-controlled DCH.

The receiver 20 of FIG. 3 comprises a receiver path 24 with a demodulator 26 for demodulating a received signal, a processing component 28 for performing the processing operation of Rake combining, a further processing component 29 for performing interference cancellation, and a decoder 30 which additionally performs deinterleaving. It should be noted that interference cancellation need not necessarily be performed immediately after Rake combining. It could alternatively be performed after deinterleaving and prior to decoding.

The receiver 20 further comprises three signal branches 30, 32, 34. A first signal branch 30 is coupled to a node 40 between the demodulator 26 and the processing component 28. The first signal branch 30 includes a first estimating component 42 that is configured to determine a first quality estimate like a first SIR related value (e.g. the SIR value, a parameter required to determine the SIR value or a parameter derived from the SIR value) on the basis of an output signal of the demodulator 26. Alternatively, the first signal branch 30 could be coupled between the processing component 28 for Rake combining and the processing component 29 for interference cancellation.

A second signal branch 32 is coupled to a second node 44 between the processing component 29 for interference cancellation and the decoder 30. The second signal branch 32 includes a second estimating component 46 that determines a second quality estimate (e.g. a second SIR related value) on the basis of an output signal of the processing component 29, i.e. on the basis of a demodulated signal that has been subjected to the advanced receiver techniques of Rake combining and interference cancellation.

A third signal branch 34 is coupled to a third node 50 which is located in the receiver path 24 behind the decoder 30. The third signal branch 34 includes a component 52 that evaluates a parameter which is indicative of the quality of the decoded signal. For example, the bit error rate (BER) or the frame error rate (FER) allow a reliable assessment of the signal quality. In the embodiment depicted in FIG. 3, a frame reliability indicator, namely the CRC check result obtained as a result of decoding a particular user data frame, is assessed to determine information relating to the quality of the decoded signal. To that end, the component 52 is configured as a CRC checker.

The receiver 20 of FIG. 3 further comprises two components 54, 56 that allow to implement and control the specific link adaptation mechanism of power control used in the first embodiment. More specifically, the receiver 20 includes a link adaptation unit 54 and a link adaptation controller 56. The link adaptation unit 54 is located in both the first signal branch 30 and the second signal branch 32. It may optionally also be included in the third signal branch 34. The link adaptation controller 56 is included in the third signal branch 34 only.

Both the link adaptation unit 54 and the link adaptation controller 56 are configured to communicate on uplink with the BS 14 or, via the BS 14, with the RNC 12 shown in FIG. 1. As becomes apparent from FIGS. 1 and 3, the three signal branches 30, 32, 34 are part of different control loops that stretch between the receiver 20 of the UE 16 on the one hand and at least one of the BS 14 and the RNC on the other hand and that include the adaptable communications link 22 on downlink as well as a plurality of control links 60 that will be discussed in more detail below.

Now the link adaptation mechanism performed during operation of the receiver 20 depicted in FIG. 3 will be explained.

A signal received by the receiver 20 via the communications link 22 is demodulated by the demodulator 26. Additionally, de-spreading in each Rake finger can be performed either in the demodulator 26 or in a subsequent processing component. The demodulated signal is input to both the processing component 28 included in the receiver path 24 and the first estimating component 42 included in the first signal branch 30. Based on the demodulated input signal the first estimating component 42 derives a first signal quality estimate that is fed to the link adaptation unit 54.

The link adaptation unit 54 can implement various power control schemes. According to a first power control scheme, the adaptation unit 54 includes a mapping mechanism for mapping the first signal estimate received from the first estimating component 42 on a signal quality parameter that constitutes or can be translated into an adaptation signal in the form of a power control command. This power control command is then transmitted via one of the control links 60 on uplink to the BS. In accordance with the received adaptation signal the BS controls transmit power on the downlink communications link 22. Thus, a fast power control loop may be established because the received signal is input into the first estimation component 42 with a comparatively low processing delay. However, since the first signal quality estimate has been generated by the first estimating component 42 on the basis of a received signal that has only slightly been processed, the first estimate of the signal quality (here a first SIR related value) is not very accurate.

According to a second power control scheme that can be implemented by the link adaptation unit 54, the first signal quality estimate in the form of the first SIR related value is compared with a target value received via one of the control links 60 and via the BS from the RNC. If the first SIR related value received from the first estimating unit 42 is higher than the target value, a power control command is generated that commands the BS to lower the transmit power on the communications link 22. If the estimated first SIR related value is too low, an adaptation signal in the form of a power up command is sent to the BS.

As has been mentioned above, the demodulated signal is not only input to the first estimating component 42 but simultaneously to the processing component 28 that performs Rake combination. The Rake combined signal is then subjected to interference cancellation. Interference cancellation constitutes an advanced receiver technique that allows to reduce the transmit power on the communications link 22 and thus enhances network capacity. Due to the complex mechanisms involved in interference cancellation, the processing component 29 is associated with a considerable processing delay.

The output signal of the processing component 29 is fed to both the decoder 30 and the second estimating component 56 in the second signal branch 32. The second estimating component 46 assesses the signal received from the processing component 29 and generates a second a signal quality estimate in the form of a second SIR related value. Since this assessment is performed on the basis of a signal that has been demodulated, Rake combined and subjected to interference cancellation, the accuracy of the second signal quality estimate is much higher than the accuracy of the first signal quality estimate generated by the first estimation component 42. However, the second signal quality estimate is generated with a significantly higher processing delay.

The second signal quality estimate is output by the second estimation component 46 and fed to the link adaptation unit 54. In the link adaptation unit 54 the second signal quality estimate is used to adjust the mapping rule for the first signal quality estimate.

If the link adaptation unit 54 implements the link adaptation scheme associated with a target value, the second estimate for the SIR related value received from the second estimating component 46 may be used to change the target value appropriately. For example in the case the second signal quality estimate (estimated second SIR related value) is higher than the first signal quality estimate (estimated first for the SIR related value), the link adaption unit 54 may control the link adaptation scheme such that the target value is lowered and vice versa.

Thus, the output signal of the second estimating component 46 is used to control the link adaptation scheme implemented by the link adaptation unit 54. It can be seen that the fast link adaptation loop includes a two-step signal quality estimation using a less accurate first signal quality estimate that is available with low processing delay and a more accurate second signal quality estimate that is obtained with a higher processing delay. In sum a fast and accurate signal quality estimation is achieved. It should be noted here that in principle the link adaptation unit 54 could also be moved from the receiver 20 to the base station 14 of FIG. 1.

In addition to the fast link adaptation loop described above an outer power control loop is provided. The outer power control loop includes the third signal branch 34 with the CRC checker 52 and the link adaptation controller 56 and operates as follows. The CRC obtained as a result of decoding of a particular user data frame is checked by the CRC checker 52 and a corresponding check result is output as a frame quality indicator to the link adaptation controller 56. The link adaptation controller 56 assesses the frame quality indicator and generates a control signal for controlling the link adaptation scheme. The link adaptation scheme might be controlled either directly, i.e. via a direct link between the link adaptation controller 56 and the link adaptation unit 54 (dashed line), or indirectly via the BS and the RNC. In the case of an indirect control the link adaptation controller 56 sends an adaptation control signal via one of the control links 60 and via the BS to the RNC and the RNC controls the link adaptation unit 54, which may either be part of the receiver 20 or of the BS as has been mentioned above. In principle the link adaptation controller 56 may also be moved to the RNC or the BS.

Depending on the outcome of the assessment that is performed within the link adaptation controller 56, the link adaptation scheme is controlled. Should for example the CRC check result indicate that the transmission quality is changing, the mapping mechanism or the target value applied by the link adaptation unit 54 may be changed upon receipt of a corresponding control signal from the link adaptation controller 56. The link adaptation controller 56 thus performs a similar task like the second estimating component 46. However, while the task of the second estimating component 46 is based on a mere estimate of the signal quality, the task of the link adaptation controller 56 is based on a statistics of a plurality of "hard" CRC check results.

While the control of the link adaptation scheme by the link adaptation controller 56 is thus more accurate than the corresponding control by the second estimating component 46, the control by the second estimating component 46 is associated with a much lower processing delay. This is due to the fact that the second signal branch 32 including the second estimating component 46 taps the receiver path 24 prior to de-interleaving and decoding, whereas the third signal branch 34 including the link adaptation controller 56 taps the receiver path 24 after de-interleaving and decoding. By means of the second estimating unit 46 and the link adaptation controller 56 a two-step link adaptation scheme control is implemented.

It should additionally be noted that the embodiment depicted in FIG. 3 allows better performance or link gain from the implementation of advanced receiver structures like interference cancellation components because the second estimating component 46 the signal enhancements are modelled more accurately. Simultaneously, the first signal estimating component 42 allows a fast link adaptation that is not effected by the processing delay associated with interference cancellation.

Figure 4:
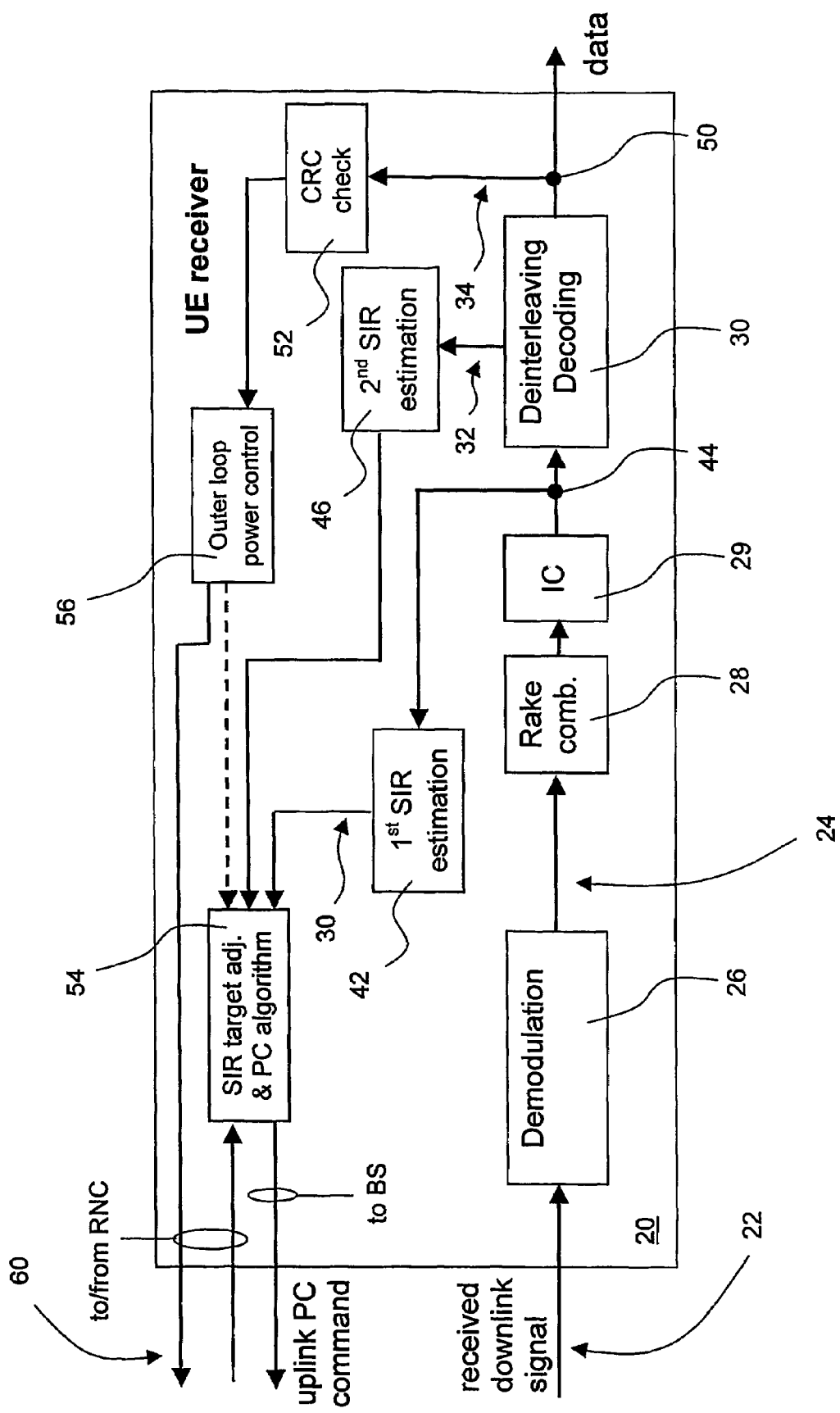
FIG. 4 is a second example embodiment of a link adaptation mechanism based on power control.
Figure 5:
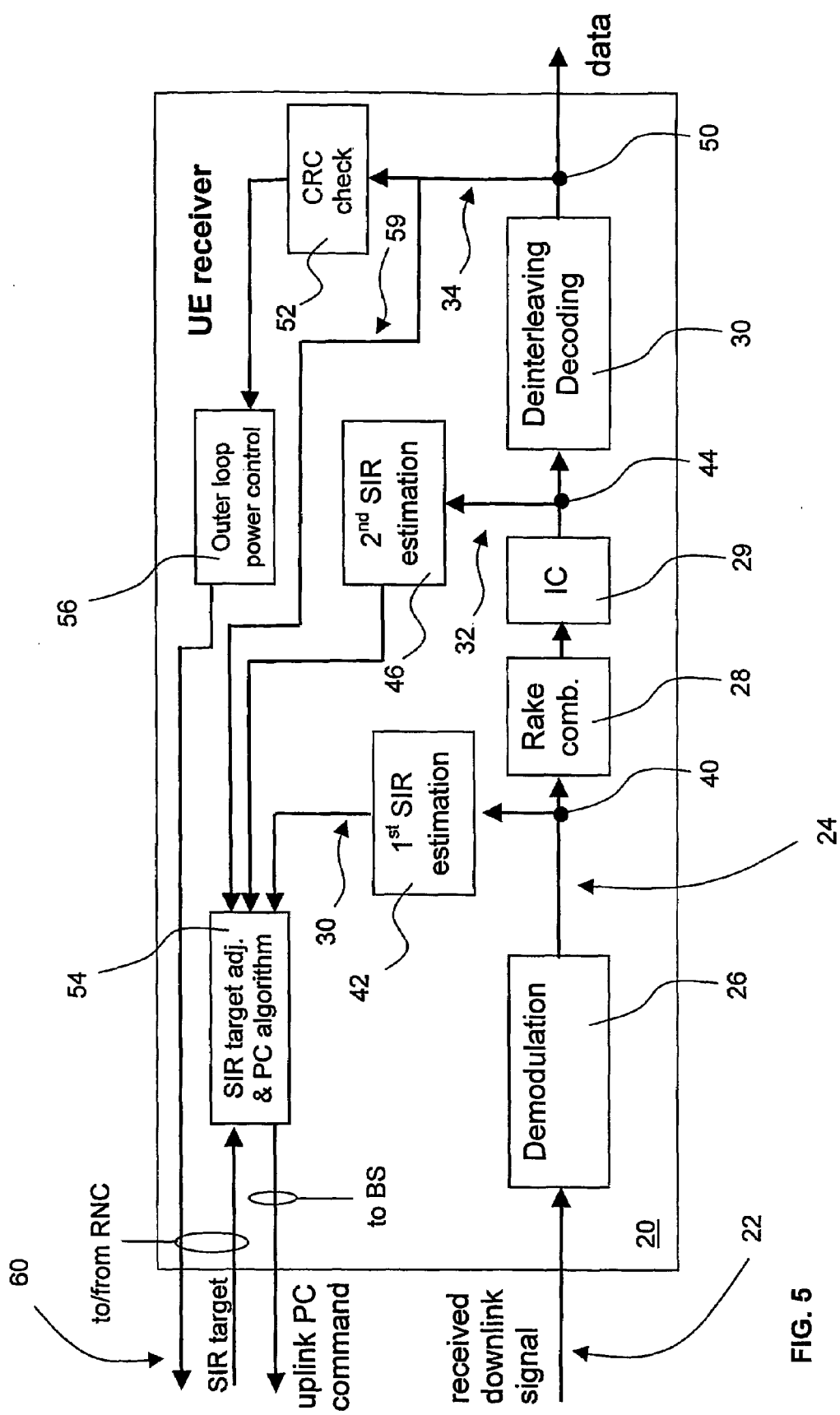
FIG. 5 is a third example embodiment of a link adaptation mechanism based on power control.
Figure 6:
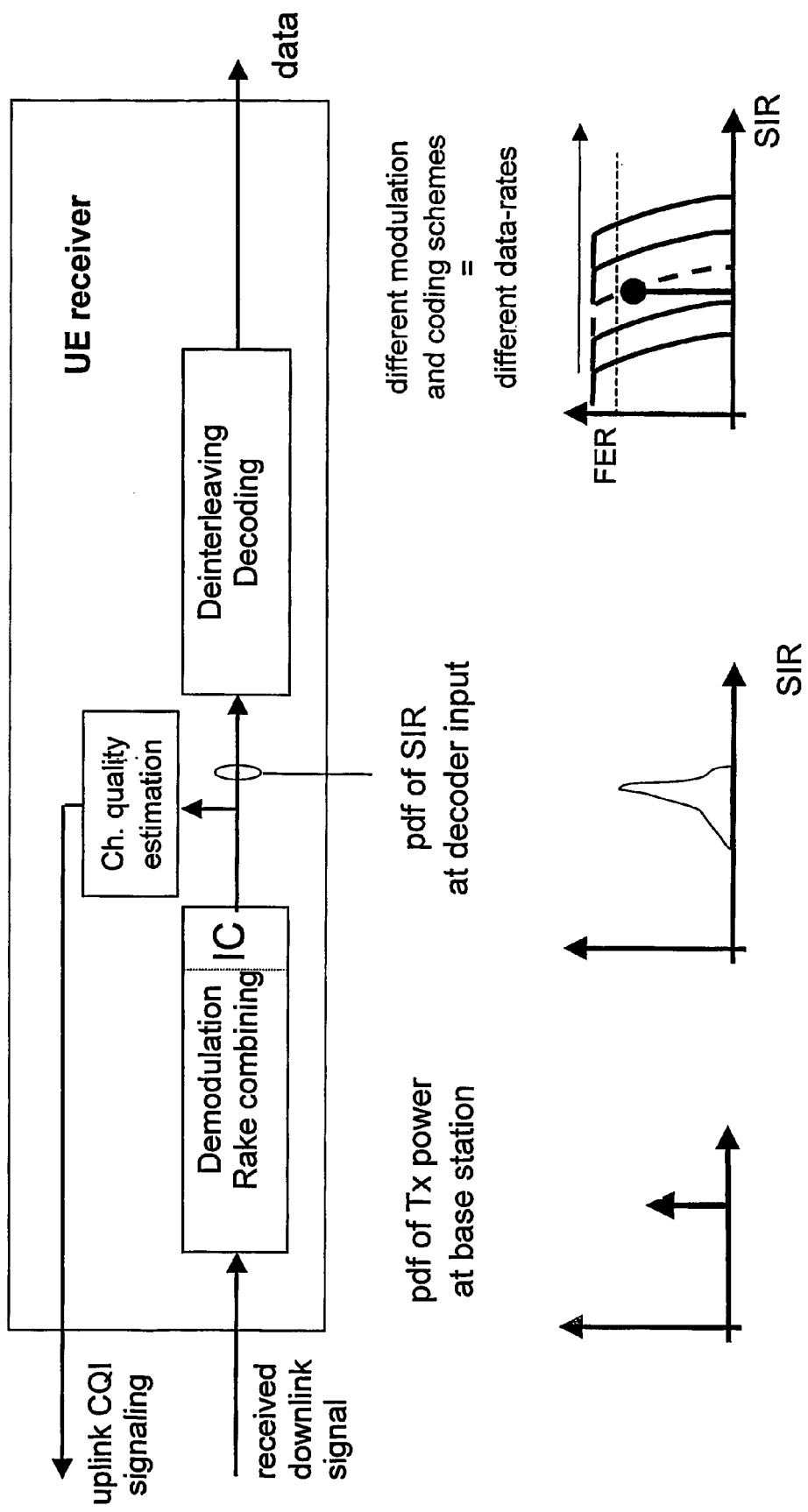
FIG. 6 is a schematic block diagram of a prior art link adaptation mechanism based on adaptive coding and modulation.

In FIGS. 4 and 5, two further example embodiments of receivers 20 are depicted. Since the embodiments are to a large extent similar to the first embodiment discussed above, only the differences to the first embodiment will be explained in more detail.

Referring to FIG. 4 it can be seen that the first signal branch 30 including the first estimating component 42 has been attached to the node 44 between the processing component 29 and the decoder 30. The second signal branch 32 has directly been attached to the decoder 30. Thus, the first signal quality estimate, i.e. the first SIR related value, is derived from the received signal after interference cancellation and the second signal quality estimate is derived based on metrics obtained during decoding.

In the third embodiment depicted in FIG. 5 the link adaptation unit 54 is attached to the output of the decoder 30 via a fourth signal branch 59. Thus, additional parameters for controlling the link adaptation scheme applied by the link adaptation unit 54 are provided.

Figure 7:
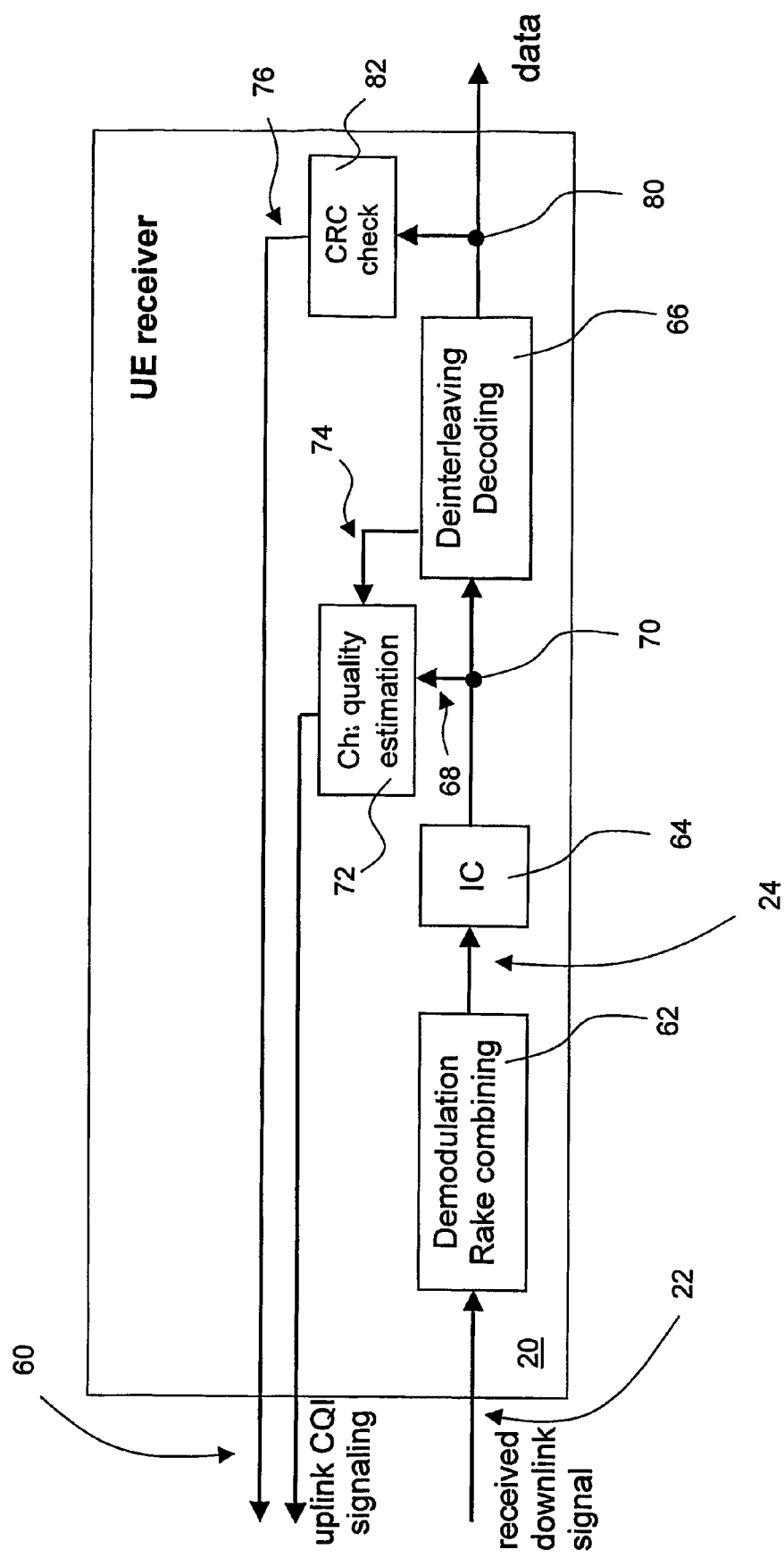
FIG. 7 is a schematic block diagram of a fourth example embodiment based on adaptive coding and modulation.

In FIG. 7 a fourth example embodiment of a receiver 20 is shown. This receiver 20 is part of the UE 18 which in FIG. 1 is attached to the BS 14 on HS-DSCH.

The fourth example embodiment is based on the link adaptation mechanism of adaptive coding and modulation. As can be seen from FIG. 7, the receiver 20 includes in a receiver path 24 a demodulator 62 that additionally performs Rake combining, a processing component 64 performing interference cancellation, and a decoder 66 additionally performing de-interleaving. In a first signal branch 68 coupled to a node 70 between the decoder 66 and the processing component 64 an estimating component 72 for performing channel quality estimation is arranged. A second signal branch 74 is coupled to the decoder 66 and transmits a first control signal, that has been generated based on metrics information obtained during decoding, to the estimating component 72. A third signal branch 76 is coupled to a third node 80 arranged in the receiver path 24 behind the decoder 66. An assessment unit in the form of a CRC checker 82 is included in the third signal branch.

Now the operation of the receiver 20 depicted in FIG. 7 will be described in more detail.

A signal received by the receiver 20 via the adaptable communications link 22 is subjected to demodulation and Rake combination in the demodulator 62 and to interference cancellation in the processing unit 64. The estimating component 72 assesses the demodulated signal output by the processing component 64 and derives an estimate for the signal quality in the form of a channel quality parameter. This channel quality parameter is used in an uplink CQI signalling context to control the modulation scheme or data rate used on the communications link 22 (fast control loop). The operations performed by the estimating component 72 can be similar to the mapping mechanism or the comparison of an estimate of an SIR related value with a target value as explained above with reference to the receiver structure of the first embodiment.

A control signal in the form of metrics information obtained during decoding is fed via the second signal branch 74 to the estimating component 72 to control the channel quality estimation performed by the estimating component 72 and to thus control the link adaptation scheme.

As can be gathered from FIG. 7, an outer control loop including the third signal branch 76 and the CRC checker 82 is additionally provided. The CRC checker 82 is configured to trigger re-transmission of a particular frame in the case the CRC check for this frame has failed.

Figure 8:
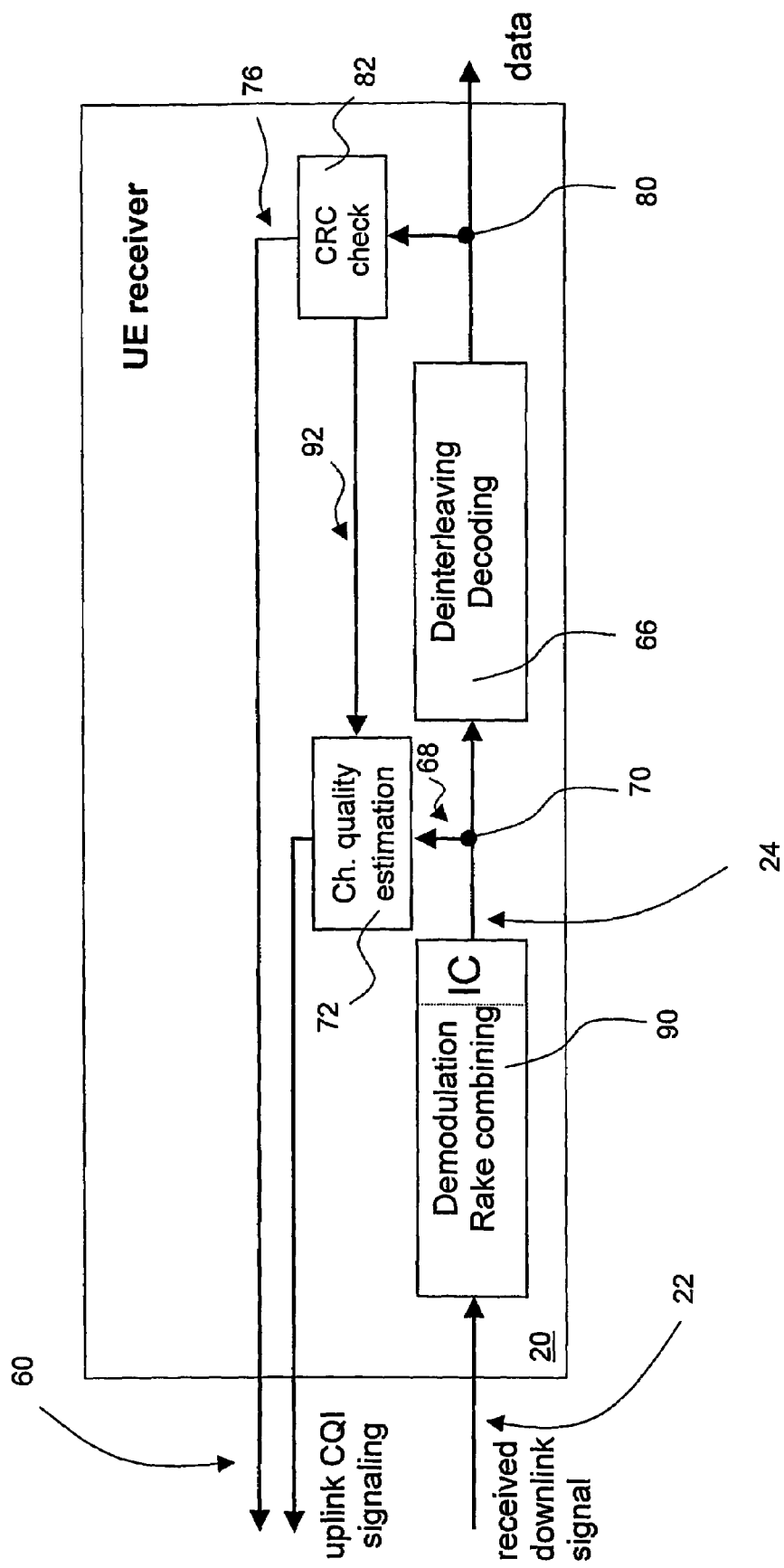
FIG. 8 is a schematic block diagram of a fifth example embodiment based on adaptive coding and modulation.

In FIG. 8 a fifth example embodiment of a receiver 20 is shown. The fifth embodiment is similar to the fourth embodiment described above with reference to FIG. 7.

Again, the first signal branch 68 including the estimating component 72 is coupled between the demodulator 90 (which in the fifth embodiment is integral with the processing component for performing interference cancellation) and the decoder 66. A second signal branch 92 is coupled from the node 80 behind the decoder 66 via the CRC checker 82 to the estimating component. A control signal in the form of the CRC check result may thus be input via the second signal branch 92 to the estimating component 72 controlling the link adaptation scheme, i.e. the modulation and code rate settings, by adjusting the parameters used during channel quality estimation.

While the present invention has been described with respect to particular example embodiments, those skilled in the art will recognize that the present invention is not limited to the specific embodiments described and illustrated herein. Therefore, while the present invention has been described in relation to its preferred example embodiments, it is to be understood that this disclosure is only illustrative. Accordingly, it is intended that the invention be limited only by the scope of the claims appended hereto.

The invention claimed is:

1. A method of adapting a communications link between a transmitter and a receiver based on a quality estimate for a signal transmitted via the communications link, comprising:
   receiving and demodulating the transmitted signal;
   a first control loop assessing the demodulated signal to derive a first estimate for the signal quality used in a link adaptation scheme in which the first estimate is mapped on a signal quality parameter in accordance with a mapping rule or compared with a target value;
   prior to decoding, further processing the demodulated signal, wherein based on at least one of the further processed, non-decoded signal and information obtained prior to conclusion of decoding a second control loop different from and slower than the first control loop derives a second different estimate for the signal quality using the further processed, non-decoded signal and uses the second signal quality estimate to control the link adaptation scheme by adjusting the mapping rule or changing the target value;

a third control loop different from and slower than the second control loop analyzing the decoded signal to generate a third signal quality estimate different from the first and second estimates and using the third signal quality estimate to change the target value; and wherein the further processing includes at least one of Rake combining, interference cancellation, and de-interleaving.

2. The method of claim 1, wherein during or after further processing the demodulated signal is assessed again to derive a second estimate for the signal quality based on which the first control signal is generated.

3. The method of claim 1, wherein at least one of the first control signal and the second estimate is generated based on metrics information obtained during further processing or decoding.

4. The method of claim 1, wherein the link adaptation scheme defines an association between the first estimate and an adaptation signal to be transmitted by the receiver.

5. The method of claim 4, wherein the first control signal changes the association between the first estimate and the adaptation signal.

6. The method of claim 1, wherein link adaptation includes at least one of transmit power control, adaptive coding and adaptive modulation.

7. The method of claim 1, wherein the third signal quality estimate is also used to control the link adaptation scheme.

8. A computer program product including a computer-readable storage medium comprising program code portions for performing the steps of claim 1 when the computer program product is run on a computing device.

9. A receiver which is configured to be coupled via an adaptable communications link to a transmitter, wherein link adaptation is performed based on a quality estimate of a signal transmitted via the communications link to the receiver, the receiver comprising:

a demodulator for demodulating the received signal;

an interference cancellation component for further processing the demodulated signal;

a decoder for decoding the interference canceled signal;

a first signal branch coupled to a first node between the demodulator and the interference cancellation component, the first signal branch including a first estimating component for deriving a first estimate for the signal quality that is to be utilized in a link adaptation scheme in which the first estimate is mapped on a signal quality parameter in accordance with a mapping rule or compared with a target value;

a second signal branch configured to receive the interference canceled signal, and using a second estimating component, derive a second signal quality estimate to be used in the link adaptation scheme along with the first signal quality estimate; and a third signal branch coupled to a third node arranged in a signal path after the decoder, an assessment unit being included in the third branch to generate a control signal for controlling the link adaptation scheme.

10. The receiver of claim 9, further comprising a rake combiner for performing rake combining on the demodulated signal prior to interference cancellation.

11. A component of a wireless communications system comprising the receiver of claim 9.

12. A wireless communications system including a transmitter, a receiver and an adaptable communications link between the transmitter and the receiver, wherein link adaptation is performed based on a quality estimate of a signal transmitted via the communications link to the receiver wherein the receiver includes the receiver of claim 9.

* * * * *